United States Patent Office

2,967,167
Patented Jan. 3, 1961

2,967,167

VULCANIZATION OF HALOGENATED COPOLYMERS WITH A PHENOL ALCOHOL AND ALKYL TIN SULFIDES AND VULCANIZABLE COMPOSITION

Leon S. Minckler, Jr., Metuchen, Delmer L. Cottle, Highland Park, and Theodore Lemiszka, Rahway, N.J., assignors to Esso Research and Engineering Company, a corporation of Delaware No Drawing. Filed Mar. 10, 1958, Ser. No. 720,089

18 Claims. (Cl. 260—41.5)

This invention relates to rubbery polymeric compositions which are halogenated copolymers of isoolefins and multiolefins and to the preparation and vulcanization of such compositions and more particularly to improved methods for curing halogenated butyl rubber with minor proportions of a combination of certain polyalkyl or polyaryl tin sulfides and phenol dialcohol resins of the polymethylol phenol type.

Copolymers of the above general type, especially where the copolymer contains about 85 to 99.5% (preferably about 95 to 99.5%) of a $C_4$ to $C_7$ isoolefin such as isobutylene with about 15 to 0.5% (preferably 5 to 0.5 weight percent) of a multiolefin of about 4 to 14, preferably about 4 to 6 carbon atoms and having a Staudinger molecular weight of between about 20,000 and 300,000, are commonly referred to in patents and literature as "butyl rubber" or GR–I rubber (Government Rubber-Isobutylene) and, for example, is referred to as "butyl rubber" in textbook "Synthetic Rubber" by G. S. Whitby. The preparation of butyl type rubber is described in U.S. Patent 2,356,128 to Thomas et al. as well as in technical literature. In general, the multiolefinic component of the rubber comprises a conjugated diolefin such as isoprene, butadiene, dimethyl butadiene, piperylene, etc. The reaction product of isobutylene and isoprene is preferred. Butyl rubber has a mole percent unsaturation of between about 0.5 to 15.0.

Halogenated butyl-type rubbery copolymers, which may be vulcanized with zinc oxide and are covulcanizable with more highly unsaturated rubbers, are produced by halogenating the butyl rubber in a manner which does not degrade the molecular weight thereof, but halogenated sufficiently to produce a rubbery product which, when vulcanized, retains its tensile strength upon heat aging. Such halogenated butyl rubbers are readily covulcanizable with more highly unsaturated rubbers with or without added sulfur to produce rubbery products of excellent heat aging resistance. The halogenated butyl rubbers so formed also do not greatly differ in curing rate as compared to natural rubber and synthetic rubbers such as GR–S rubber.

It has now been discovered that halogenated butyl rubber may be cured to produce vulcanizates exhibiting improvements in stress-strain properties such as improved tensile strength and extension modulus, as well as improved hysteresis and dynamic properties by vulcanizing the halogenated butyl rubber, in the absence of other sulfur-containing curatives such as sulfur or sulfur accelerators, with a combination of either di-$C_1$ to $C_{18}$ alkyl tin sulfides and/or di-$C_6$ to $C_{18}$ aryl tin sulfides and a polymethylol phenol resin, with or without added metal oxides such as zinc oxide, magnesium oxide and the like.

In practicing the present invention, 100 parts by weight of halogenated butyl rubber are compounded in the absence of added sulfur with about 20 to 100 parts by weight of a filler such as clays or carbon blacks, about 0.5 to 20.0, advantageously about 1.0 and 10.0, and preferably about 2 to 6 parts by weight of a $C_1$ to $C_{18}$ di-alkyl and/or a $C_6$ to $C_{18}$ di-aryl tin sulfide and about 0.5 to 20, advantageously 1 to 10 and preferably about 2 to 8 parts by weight of a polymethylol phenol resin with the optional addition of about 2 to 30 parts by weight of zinc oxide and/or magnesium oxide and/or such conventional compounding agents as antioxidants such as phenyl beta-naphthylamine, antitack agents such as stearic acid, resins, plasticizers, etc. The resulting compounded stock is then cured by heating the same for about 1 minute to 5 hours, advantageously for about 5 minutes to 3 hours and preferably for about 15 minutes to 2 hours at a temperature level of between about 200° to 400° F. and preferably at about 275° to 375° F. to produce a vulcanizate having a combination of excellent tensile strength and extension modulus as well as low permanent set and low loss of energy as shown by a low absolute damping (i.e., internal viscosity times frequency of oscillation).

In producing halogenated butyl rubber to be vulcanized in accordance with the present invention, unmodified, unvulcanized butyl rubber is carefully halogenated so as to contain about at least 0.5 weight percent (preferably at least about 1.0 weight percent) combined halogen but not more than about "X" weight percent combined chlorine or 3 "X" weight percent combined bromine wherein:

$$X = \frac{M_3 L}{(100-L)M_1 + L(M_2+M_3)} \times 100$$

and:

$L$ = mole percent of the multiolefin in the polymer
$M_1$ = molecular weight of the isoolefin
$M_2$ = molecular weight of the multiolefin
$M_3$ = atomic weight of chlorine or bromine Restated, there should be at least about 0.5 weight percent of combined halogen in the polymer but not more than about one atom of chlorine or 3 atoms (preferably 2) of bromine combined in the polymer per molecule of multiolefin present therein: i.e., not more than about 1 atom of combined chlorine or 3 atoms of combined bromine per double bond in the polymer.

Suitable halogenating agents which may be employed are gaseous chlorine, liquid bromine, alkali metal hypochlorites, sodium hypobromite, $C_4$ to $C_{10}$ tertiary alkyl hypochlorites or hypobromites, sulfur chlorides or bromides (particularly oxygenated sulfur chlorides or bromides), pyridinium chloride perchloride, N-bromo-succinimide, iodine monochloride, alpha-chloroacetoacetanilide, tri-bromophenol bromide, N-chloroacetamide, N-bromo-phthalimide, N,N'-dimethyl-5,5 dichloro or dibromo hydantoin, and other common halogenating agents.

The halogenation is generally conducted at about 0° to about +150° C., advantageously at about 0° to 65° C., preferably at about 20° to 50° C. (room temperature being satisfactory), depending upon the particular halogenation agent, for about one minute to several hours. An advantageous pressure range is from about 0.5 to 400 p.s.i.a.; atmospheric pressure being satisfactory. The halogenation conditions are regulated to halogenate the rubbery copolymer to the extent above-mentioned.

The halogenation may be accomplished in various ways. For instance, the solid copolymer may be halogenated per se. Another process comprises preparing a solution of the copolymer as above, in a suitable inert liquid organic solvent such as a $C_3$ to $C_{10}$ or preferably a $C_5$ to $C_8$ inert hydrocarbon or halogenated derivatives of saturated hydrocarbons, examples of which are hexane, heptane, naphtha, mineral spirits, cyclohexane, alkyl substituted cycloparaffins, benzene, chlorobenzene, chloroform, trichloroethane, carbon tetrachloride, mixtures thereof, etc., and adding thereto gaseous chlorine, liquid bromine, or other halogenating agent, which may optionally be in solution, such as dissolved in any inert hydrocarbon, an alkyl chloride, carbon tetrachloride, etc.

The concentration of the butyl rubber in the solvent will depend upon the type of reactor, molecular weight of the butyl rubber, etc. In general, the concentration of a butyl rubber having a viscosity average molecular weight of about 200,000 to about 1,500,000, if the solvent is a substantially inert hydrocarbon, will be between 1 and 30% by weight, preferably about 5 to 20%. If chlorine gas is employed to chlorinate such a rubbery solution, it may also be diluted with up to about 50 times its volume, preferably about 0.1 to 5.0 times its volume of an inert gas such as nitrogen, methane, ethane, carbon dioxide, etc.

The resulting halogenated butyl rubber polymer may be recovered in various manners. The polymer may be precipitated with acetone or any other known non-solvent for the butyl rubber and dried under about 1 to 760 millimeters or higher of mercury pressure absolute at about 0° to 180° C., preferably at about 50° to 150° C. (e.g., 70° C.). Other methods of recovering the halogenated butyl rubber polymer from the hydrocarbon solution of the same are by conventional spray or drum drying techniques. Alternatively, the halogenated butyl rubber-containing solution may be injected into a vessel containing agitated water heated to a temperature sufficient to flash off the hydrocarbon solvent and form an aqueous slurry of the halogenated butyl rubber. The halogenated butyl rubber may then be separated from this slurry by filtration, dried and recovered as a "crumb" or as a dense sheet or slab by conventional milling and/or extruding procedures. The halogenated copolymer formed advantageously has a viscosity average molecular weight between about 200,000 and 1,500,000 and a mole percent unsaturation of between about 0.5 to 15.0, preferably about 0.6 to 5.0.

The phenol dialcohols which are advantageously polymethylol phenols (e.g., dimethylol phenols) are typically made by reacting a para-substituted phenol having the two ortho positions unsubstituted, with a considerable molar excess of formaldehyde, the molar ratio of formaldehyde to phenol generally being about 2:1, in the presence of a strong alkaline catalyst, especially an alkali metal hydroxide, which is subsequently neutralized. Usually the mixture of the phenol, formaldehyde and alkaline catalyst is heated at a suitable temperature, e.g., 25° to 100° C., during the first stage of the reaction involving the formation of the phenol methylol, i.e., the para-substituted 2,6-dimethylol phenol. This material, which is a phenol dialcohol, can be isolated by acidification of the mixture and separation of the oily layer which can then be advanced to higher molecular weight form by heating at say 75°–175° C. This higher molecular weight form is oil-soluble and heat-reactive, and has the advantage that it is more reactive with the butyl rubber than the lower molecular weight form. Separation of the phenol dialcohol can be omitted, in which case the reaction is carried past the monomer stage to the resinous stage, whereupon the mixture is neutralized and water is removed to give the resinous material. In any case care should be taken to stop while the resin is in the soluble (in conventional organic solvents and drying oils) and fusible state.

The phenol from which the dimethylol phenol is made generally has a hydrocarbon group in the position para to the phenolic hydroxyl, examples being alkyl groups, especially alkyl groups having from 3 to 20 carbon atoms, tertiary-butyl and tertiary-octyl (alpha, alpha, gamma, gamma tetramethyl butyl) being especially preferred among the lower alkyls (8 carbon atoms or less), cycloalkyl groups, aryl groups, such as phenyl, and aralkyl groups such as benzyl and cumyl. Examples of suitable dimethylol phenols that may be used in the invention either in the polymeric or monomeric form are as follows:

2,6-dimethylol-4-methyl phenol
2,6-dimethylol-4-tertiary-butyl phenol
2,6-dimethylol-4-dodecyl phenol
2,6-dimethylol-4-octyl phenol
2,6-dimethylol-4-phenyl phenol
2,6-dimethylol-4-benzyl phenol
2,6-dimethylol-4-(alpha, alpha-dimethyl benzyl) phenol
2,6-dimethylol-4-cyclohexyl phenol Other types of suitable dimethylol phenols comprise meta-substituted polymethylol phenol curing agents. These agents are prepared by reacting about 1 part by weight of a meta-substituted phenol with about 0.1 to 2.0 parts by weight of an aldehyde at a temperature between about 50° and 300° F. for between 0.1 to 24 hours in the presence of 0.005 to 0.5 part by weight of an alkaline catalyst, such as sodium hydroxide. The reaction product may contain one or more aromatic rings depending upon whether or not the methylol compound is permitted to polymerize into a low molecular weight resin. It is preferred to use the curing agent in its monomer, dimer or trimer form. The phenol may be monohydric or polyhydric. The meta position of the phenol may be substituted with an alkyl, aryl, or alkaryl hydrocarbon group having 1 to 20 carbon atoms. It is preferred to employ a phenol having a $C_{14}$ to $C_{18}$ aliphatic hydrocarbon attached to its meta position. Only one of the two meta positions should be occupied by the hydrocarbon, leaving the other meta, the two ortho and para positions open to react with the aldehyde. For instance, a meta-substituted monohydric phenol is reacted with formaldehyde in the presence of sodium hydroxide to produce a substance having methylol groups situated in the ortho, meta or para positions, depending upon the reaction conditions. In most instances, the methylol groups are in the ortho position, e.g., 2,6-dimethylol-m-substituted phenol.

Suitable meta-substituted polymethylol curing agents include the condensation products of formaldehyde and any of the following representative substituted phenols: m-cresol; m-butyl phenol; 3-hydroxy diphenyl; m-pentadecyl phenol; m-butoxy phenol; 2-bis(3-hydroxy phenyl) propane; 3-hydroxy, 3'-butyl diphenyl and m-pentadecyl resorcinol.

In order to more fully illustrate the present invention the following experimental data are given:

*Example I*

100 parts by weight of a brominated butyl rubber having a Mooney viscosity (212° F. for 8 minutes) of 57, a mole percent unsaturation of 0.88, a viscosity average molecular weight of 390,000, and a combined bromine content of 2.40 were compounded with 50 parts by weight of HAF carbon black, 1.0 part by weight of stearic acid and with various combinations of curatives including poly alkyl and aryl tin sulfides and polymethylol phenol resins in accordance with the invention with the following results when cured for 60 minutes at 307° F.:

| Component | Parts by weight | | | | | | |
|---|---|---|---|---|---|---|---|
| | Run (a) | Run (b) | Run (c) | Run (d) | Run (e) | Run (f) | Run (g) |
| ZnO | 5.0 | | | | | | 5.0 |
| Dibutyl tin sulfide | | 5.0 | 5.0 | 5.0 | | 5.0 | 5.0 |
| Magnesium oxide | | | 5.0 | | | | |
| Tetramethyl thiuram disulfide | | | | 1.0 | | | |
| p-octyl phenol-formaldehyde resin | | | | | 5.0 | 5.0 | 5.0 |
| Tensile strength (p.s.i.) | 2,470 | 2,835 | 2,520 | 3,015 | 1,315 | 2,650 | 2,110 |
| Goodrich Flexometer Data: | | | | | | | |
| Permanent Set (percent) | 3.6 | 2.0 | 3.0 | 4.0 | 32.0 | 1.2 | 0.5 |
| Max. temperature rise during flexing (° C.) | 32.0 | 29.0 | 23.0 | 23.0 | 39.0 | 9.5 | 9.0 |

The above data show that only by using a combination of a di-alkyl tin sulfide and a polymethylol phenol resin (i.e., runs (f) and (g) are a combination of low permanent set and low temperature rise during flexing coupled with good tensile strengths obtained.

*Example II*

100 parts by weight of a chlorinated butyl rubber having a Mooney viscosity (212° F. for 8 minutes) of 65, a mole percent unsaturation of 1.3, a viscosity average molecular weight of 475,000 and a combined chlorine content of 1.1 weight percent were compounded with 50 parts by weight of HAF carbon black, 1.0 part by weight of stearic acid and with various combinations of curatives including polyalkyl and aryl tin sulfides, zinc oxide, and polymethylol phenol resins in accordance with the invention with the following results when cured for 60 minutes at 307° F.:

| Component | Parts by weight | | | | | | |
|---|---|---|---|---|---|---|---|
| | Run (h) | Run (i) | Run (j) | Run (k) | Run (l) | Run (m) | Run (n) |
| ZnO | 5.0 | | 5.0 | | | | |
| Dibutyl tin sulfide | | | 5.0 | 5.0 | 5.0 | 5.0 | 5.0 |
| Magnesium oxide | | | | 5.0 | | 5.0 | |
| Tetramethyl thiuram disulfide | | | | | 1.0 | | |
| p-octyl phenol-formaldehyde resin | | | | | | 5.0 | 5.0 |
| Tensile strength (p.s.i.) | 2,013 | | 2,610 | 2,445 | 2,555 | 2,500 | 2,430 |
| Goodrich Flexometer Data: | | | | | | | |
| Permanent Set (percent) | 7.6 | | 4.9 | 3.8 | 7.0 | 2.1 | 4.1 |
| Max. temperature rise during flexing (° C.) | 37 | | 21 | 19 | 26 | 13 | 15 |

The above data show that only by using a combination of a di-alkyl tin sulfide and a polymethylol phenol resin (i.e., runs (m) and (n) are low permanent set and low temperature rise during flexing coupled with good tensile strength obtained.

Resort may be had to modifications and variations without departing from the spirit of the invention or the scope of the appended claims.

What is claimed is:

1. A composition comprising 100 parts by weight of a rubbery halogenated copolymer of about 85 to 99.5 weight percent of a $C_4$ to $C_7$ isoolefin and about 15 to 0.5 weight percent of a $C_4$ to $C_{14}$ multiolefin, about 0.5 to 20.0 parts by weight of a phenol dialcohol resin and about 0.5 to 20 parts by weight of an organic tin sulfide selected from the group consisting of di-$C_1$ to $C_{18}$ alkyltin sulfides, di-$C_6$ to $C_{18}$ aryltin sulfides and mixtures thereof.

2. A composition according to claim 1 in which the halogenated copolymer contains at least 0.5 weight percent chlorine but not more than about one atom of chlorine per double bond in the copolymer.

3. A composition according to claim 1 in which the halogenated copolymer contains at least about 0.5 weight percent bromine but not more than about three combined atoms of bromine per double bond in the copolymer.

4. A composition according to claim 1 in which the organic tin sulfide is present in an amount of between about 1.0 and 10.0 weight percent based on halogenated copolymer, the copolymer being in composition with 2-30 parts by weight of zinc oxide per 100 parts by weight of copolymer.

5. A composition according to claim 1 in which the organic tin sulfide is dimethyltin sulfide.

6. A composition according to claim 1 in which the organic tin sulfide is dibutyltin sulfide.

7. A composition according to claim 1 in which the organic tin sulfide is dioctyltin sulfide.

8. A composition according to claim 1 in which the organic tin sulfide is dilauryltin sulfide.

9. A composition according to claim 1 in which the organic tin sulfide is diphenyltin sulfide.

10. A composition comprising a rubbery polymer having a viscosity average molecular weight of at least about 100,000 comprising atoms of hydrogen, carbon and a halogen selected from the group consisting of bromine, chlorine, iodine and mixtures thereof, containing in its structure a major proportion of hydrocarbon units derived by the polymerization of isoolefins containing about 4 to 7 carbon atoms and also containing sufficient units in which a pair of carbon atoms is linked by an olefinic double bond that the mole percent unsaturation is between about 0.5 and 15; said polymer containing at least about 0.5 weight percent halogen but not more than about one combined atom of halogen per double bond in the polymer; 100 parts by weight of said polymer being in composition with about 0.5 to 20 parts by weight of a polymethylol phenol resin and about 0.5 to 20 parts by weight of an organic tin sulfide selected from the group consisting of di-$C_1$ to $C_{18}$ alkyltin sulfides, di-$C_6$ to $C_{18}$ aryltin sulfides, and mixtures thereof.

11. A composition according to claim 10 in which the polymer contains a member selected from the group consisting of chlorine, bromine, and mixtures thereof.

12. A composition according to claim 10 in which the composition contains, per 100 parts by weight of polymer, about 2 to 30 parts by weight of a metal oxide selected from the group consisting of zinc and magnesium oxide.

13. A composition according to claim 10 in which the organic tin sulfide is present in an amount of between about 2 and 6 weight percent based on the halogen-containing polymer.

14. A composition according to claim 10 in which the polymer is also in composition with about 20 to 100 parts by weight of a filler per 100 parts by weight of polymer.

15. A composition according to claim 10 which has been vulcanized for between about 15 minutes and 2 hours at a temperature level of between about 275° and 375° F. to produce a vulcanizate having a tensile strength of at least about 2,000 p.s.i., a temperature rise on flexing of not more than about 15° C. and a permanent set of not more than about 5%.

16. A process which comprises vulcanizing 100 parts by weight of a halogenated isoolefin-multiolefin butyl rubber copolymer in the presence of about 0.5 to 20.0 weight percent each of a mixture of a polymethylol phenol and an organic tin sulfide selected from the group consisting of di-$C_1$ to $C_{18}$ alkyltin sulfides, di-$C_6$ to $C_{18}$ aryltin sulfides, and mixtures thereof at a temperature level of between about 200° and 400° F. until resulting vulcanizate exhibits a tensile strength of at least about 2500 p.s.i., a permanent set of not more than about 5%, and a temperature rise upon flexing of not more than about 15° C.

17. A process according to claim 16 in which the halogenated butyl rubber contains chlorine.

18. A process according to claim 16 in which the halogenated butyl rubber contains bromine.

References Cited in the file of this patent

UNITED STATES PATENTS 2,726,224  Peterson et al. _____ Dec. 6, 1955
2,857,357  Smith _____ Oct. 21, 1958